(12) United States Patent
Cron et al.

(10) Patent No.: US 11,260,695 B2
(45) Date of Patent: Mar. 1, 2022

(54) REINFORCED RUBBER SPOKE FOR A TIRE

(71) Applicants: Compagnie Generale des Etablissements Michelin, Clermont-Ferrand (FR); Steven M Cron, Greenville, SC (US); Timothy Brett Rhyne, Greenville, SC (US); Ryan Michael Gaylo, Simpsonville, SC (US)

(72) Inventors: Steven M Cron, Greenville, SC (US); Timothy Brett Rhyne, Greenville, SC (US); Ryan Michael Gaylo, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 422 days.

(21) Appl. No.: 16/338,659

(22) PCT Filed: Oct. 3, 2017

(86) PCT No.: PCT/US2017/054979
§ 371 (c)(1),
(2) Date: Apr. 1, 2019

(87) PCT Pub. No.: WO2018/067597
PCT Pub. Date: Apr. 12, 2018

(65) Prior Publication Data
US 2020/0039293 A1    Feb. 6, 2020

Related U.S. Application Data

(60) Provisional application No. 62/403,702, filed on Oct. 3, 2016.

(51) Int. Cl.
*B60C 7/14*      (2006.01)
*B60B 9/26*      (2006.01)
*B60C 11/00*     (2006.01)

(52) U.S. Cl.
CPC ............... *B60C 7/146* (2021.08); *B60B 9/26* (2013.01); *B60B 2360/341* (2013.01); *B60C 7/14* (2013.01); *B60C 11/00* (2013.01)

(58) Field of Classification Search
CPC ............... B60C 7/14; B60C 2007/146; B60C 2007/107; B60C 11/00; B60C 7/146; B60C 7/107; B60B 9/26
See application file for complete search history.

(56) References Cited

U.S. PATENT DOCUMENTS

| 711,081 A | 1/1902 | Stevens |
| 1,665,558 A | 4/1928 | Montgomery |

(Continued)

FOREIGN PATENT DOCUMENTS

| CN | 203157578 U | 8/2013 |
| DE | 29608495 U1 | 8/1996 |

(Continued)

OTHER PUBLICATIONS

European Patent Office; International Search Report and Written Opinion for patent application PCT/US2017/054979; dated Dec. 18, 2017; Publisher: European Patent Office, Rijswijk, Netherlands, pp. 1-12, enclosed.

*Primary Examiner* — Kip T Kotter
(74) *Attorney, Agent, or Firm* — John Steckler Schwab

(57) ABSTRACT

A spoke (100) for a wheel (10) attaching an outer tread (200) to a hub (20), the spoke having a first (142) and second (144) spoke elements joined by a joint body (130) comprised of an elastomer connecting the first spoke element to a second spoke element.

18 Claims, 9 Drawing Sheets

(56) References Cited

U.S. PATENT DOCUMENTS

| | | | |
|---|---|---|---|
| 2,742,941 A * | 4/1956 | Johnson | B60C 7/12 |
| | | | 152/326 |
| 3,730,244 A | 5/1973 | Wr | |
| 3,973,613 A | 8/1976 | Marzocchi | |
| 4,553,577 A | 11/1985 | Gregg | |
| 4,715,419 A | 12/1987 | Kawasaki | |
| 5,042,544 A | 8/1991 | Dehasse | |
| 5,565,257 A | 10/1996 | Tingley | |
| 6,321,808 B1 | 11/2001 | Spragg | |
| 6,422,279 B1 | 7/2002 | Williams | |
| 7,363,805 B2 | 4/2008 | Jayakumar | |
| 7,418,988 B2 | 9/2008 | Cron | |
| 10,654,318 B2 * | 5/2020 | Kim | B60C 7/143 |
| 2007/0267116 A1 | 11/2007 | Rhyne | |
| 2008/0250843 A1 | 10/2008 | Albohr | |
| 2008/0265659 A1 | 10/2008 | Heyse | |
| 2008/0314486 A1 * | 12/2008 | Manesh | B60C 7/00 |
| | | | 152/328 |
| 2010/0193097 A1 | 8/2010 | McNier | |
| 2012/0234444 A1 * | 9/2012 | Palinkas | B60C 7/22 |
| | | | 152/246 |
| 2014/0083581 A1 | 3/2014 | Schaedler et al. | |

FOREIGN PATENT DOCUMENTS

| | | | |
|---|---|---|---|
| DE | 19538082 A1 | 4/1997 | |
| FR | 334354 A | 12/1903 | |
| FR | 348847 A | 4/1905 | |
| FR | 1164324 A | 10/1958 | |
| FR | 1604616 A | 1/1972 | |
| FR | 2566335 A1 | 12/1985 | |
| GB | 165662 A | 7/1920 | |
| JP | 2006117130 A | 5/2006 | |
| JP | 2008132951 A * | 6/2008 | |
| JP | 2010000761 A * | 1/2010 | B29D 30/02 |
| JP | 2011183894 A | 9/2011 | |
| JP | 2014100933 A * | 6/2014 | |
| JP | 2015151009 A | 8/2015 | |
| WO | 2009005946 A1 | 8/2009 | |
| WO | 2010007636 A1 | 1/2010 | |
| WO | 2011046553 A1 | 4/2011 | |
| WO | 2013095499 A1 | 6/2013 | |

* cited by examiner

REINFORCED RUBBER SPOKE FOR A TIRE

FIELD OF THE INVENTION

The subject matter of the present invention relates to a support structure for a tire.

SUMMARY OF THE INVENTION

Aspects and advantages of the invention will be set forth in part in the following description, or may be obvious from the description, or may be learned through practice of the invention.

A spoke for a tire, said tire being attached to a hub comprising an outer tread band, a first spoke element, a second spoke element and a joint body connecting said first spoke element and said second spoke element, wherein said joint body comprises an elastic material arranged such that said first spoke element and said second spoke element is deflectable in at least a first plane of bending, where in the first spoke element and second spoke element are disposed between said hub and said outer tread band.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
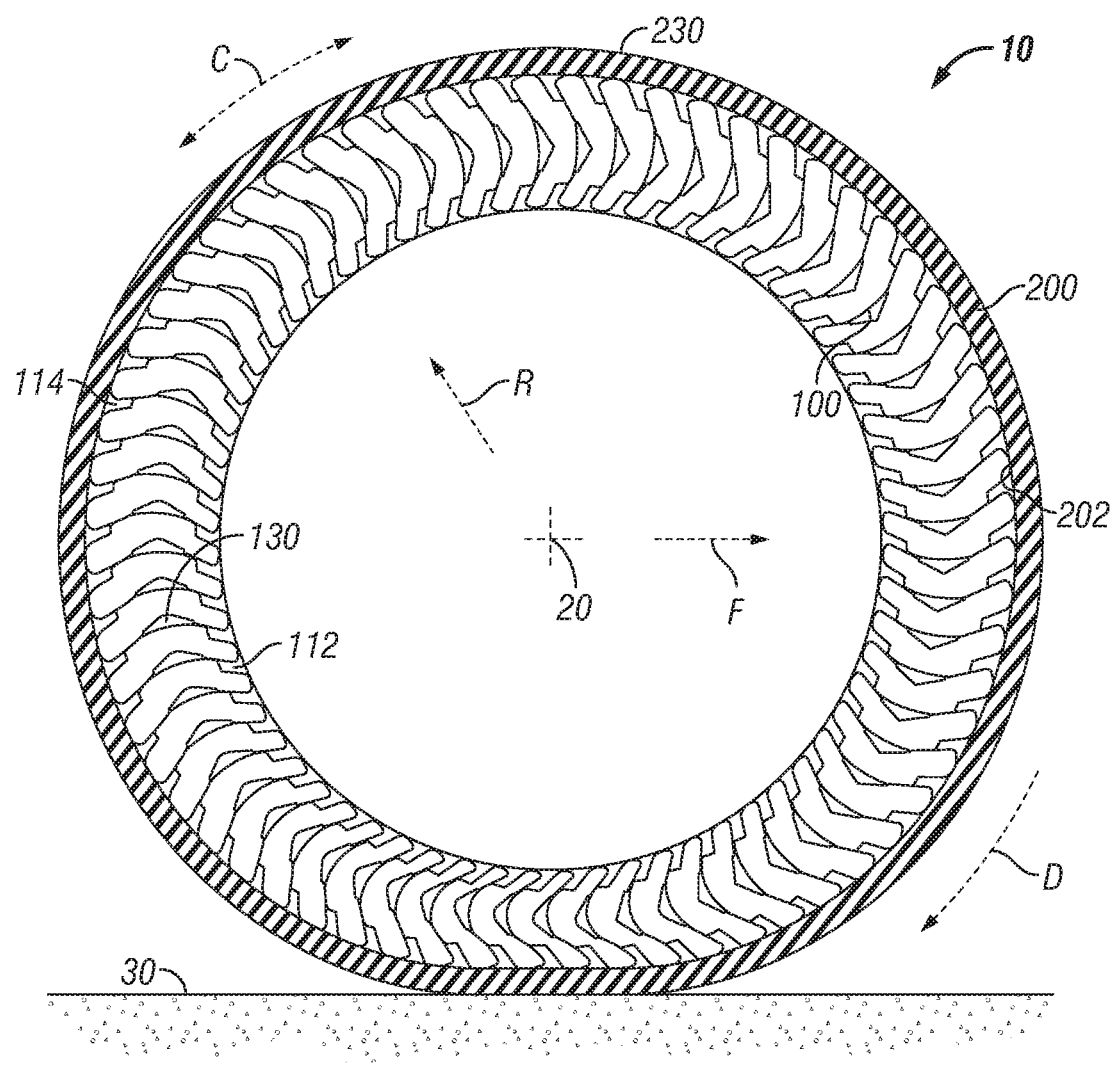
FIG. 1 provides a lateral side view of an exemplary embodiment of a plurality of spokes of the present invention forming a part of a tire under nominal loading conditions.

The present invention provides a mechanical structure for resiliently supporting a load. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Axial direction" or the letter "A" in the figures refers to a direction parallel to the axis of rotation of for example, the shear band, tire, and/or wheel as it travels along a road surface.

"Radial direction" or the letter "R" in the figures refers to a direction that is orthogonal to the axial direction and extends in the same direction as any radius that extends orthogonally from the axial direction.

"Equatorial plane" means a plane that passes perpendicular to the axis of rotation and bisects the outer tread band and/or wheel structure.

"Circumferential direction" or the letter "C" in the figures refers to a direction is orthogonal to the axial direction and orthogonal to a radial direction.

"Forward direction of travel" or the letter "F" in the figures refers to the direction the tire was designed to predominantly travel in for aesthetics and or performance reasons. Travel in a direction different than the forward direction of travel is possible and anticipated.

"Direction of rotation" or the letter "D" in the figures refers to the direction the tire was designed to predominantly rotate in for aesthetics and/or performance reasons. Rotation in a direction opposite than the direction of rotation is possible and anticipated.

"Radial plane" means a plane that passes perpendicular to the equatorial plane and through the axis of rotation of the wheel.

"Lateral direction" or the letter "L" means a direction that is orthogonal to an equatorial plane.

"Elastic material" or "Elastomer" as used herein refers to a polymer exhibiting rubber-like elasticity, such as a material comprising rubber.

"Deflectable" means able to be bent resiliently.

"Nominal load" or "desired design load" is a load for which the wheel or tire is designed to carry and operate under. The nominal load or desired design load includes loads up to and including the maximum load specified by the manufacturer and, in the case of a vehicle tire, often indicated by marking on the side of a the tire. A loading condition in excess of the nominal load may be sustained by the tire, but with the possibility of structural damage, accelerated wear, or reduced performance.

"Modulus" or "Modulus of elongation" (MPa) was measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

FIG. 1 shows an exemplary embodiment of a plurality of spokes 100 of the present invention attached to an outer tread band 200 and forming a part of a tire 10. The tire 10 may be incorporated into a wheel. For example the tire 10 may be part of non-pneumatic wheel attached to a passenger vehicle allowing the vehicle to roll across a ground surface. Other objects and vehicles may incorporate the invention, including but not limited to: heavy duty truck, trailer, light truck, off-road, ATV, bus, aircraft, agricultural, mining, bicycle, motorcycle and passenger vehicle tires. Such a non-pneumatic wheel would possess a hub (not shown) that would have a radially outer surface having an axis of revolution about a central axis 20. The tire 10 may be attached to the hub (not shown) by any of a number of methods, for example, by mechanical fasteners such as bolts, screws, clamps or slots, and/or by adhesives such as cyanoacrylates, polyurethane adhesives, and/or by other bonding materials or a combination thereof.

The tire 10 shown here possesses an axis of rotation 20 about which the tire 10 rotates. In this exemplary embodiment, the radially outer surface 230 of the outer tread band 200 interfaces with a ground surface 30 over which the tire rolls. Under a nominal load, the spokes 100 of the tire flex as the tire enter and exit the contact patch. Smaller deflections occur in the spokes 100 as the spoke rotates about the axis 20 outside the contact patch, but the majority of the deflection occurs while the spoke 100 enters, exits and travels through the contact patch.

Each spoke 100 possesses a "nose" portion 130 which acts as a joint body connecting the radially inner portion and radially outer portion of the spoke. The radially inner portion of the spoke possesses a radially inner foot 112 which connects to the hub (not shown). The radially outer portion of the spoke 100 possesses a radially outer foot 114 which connects to the outer tread band 200.

In the exemplary embodiment shown, the tread band 200 comprises an elastomeric material and allows deformation to form a planar footprint in the contact patch. The radially outer foot 114 of the spoke 100 is attached to the radially inner surface 202 of the tread band 200. In the exemplary embodiment shown, the spoke is adhered in place by a cyanoacrylate adhesive. In other embodiments, the spoke may be attached by other methods, including by adhering the elastomeric material together, for instance by using green rubber and curing the rubber components together, or using a strip of green rubber between cured or partially cured rubber components. In some embodiments, the outer tread band 200 may also possess a reinforcement to help carry the load circumferentially around the tire.

For this particular embodiment, the size of the tire 100 is 205/55R16 with the lateral width of the tread being about 165 mm.

Figure 2:
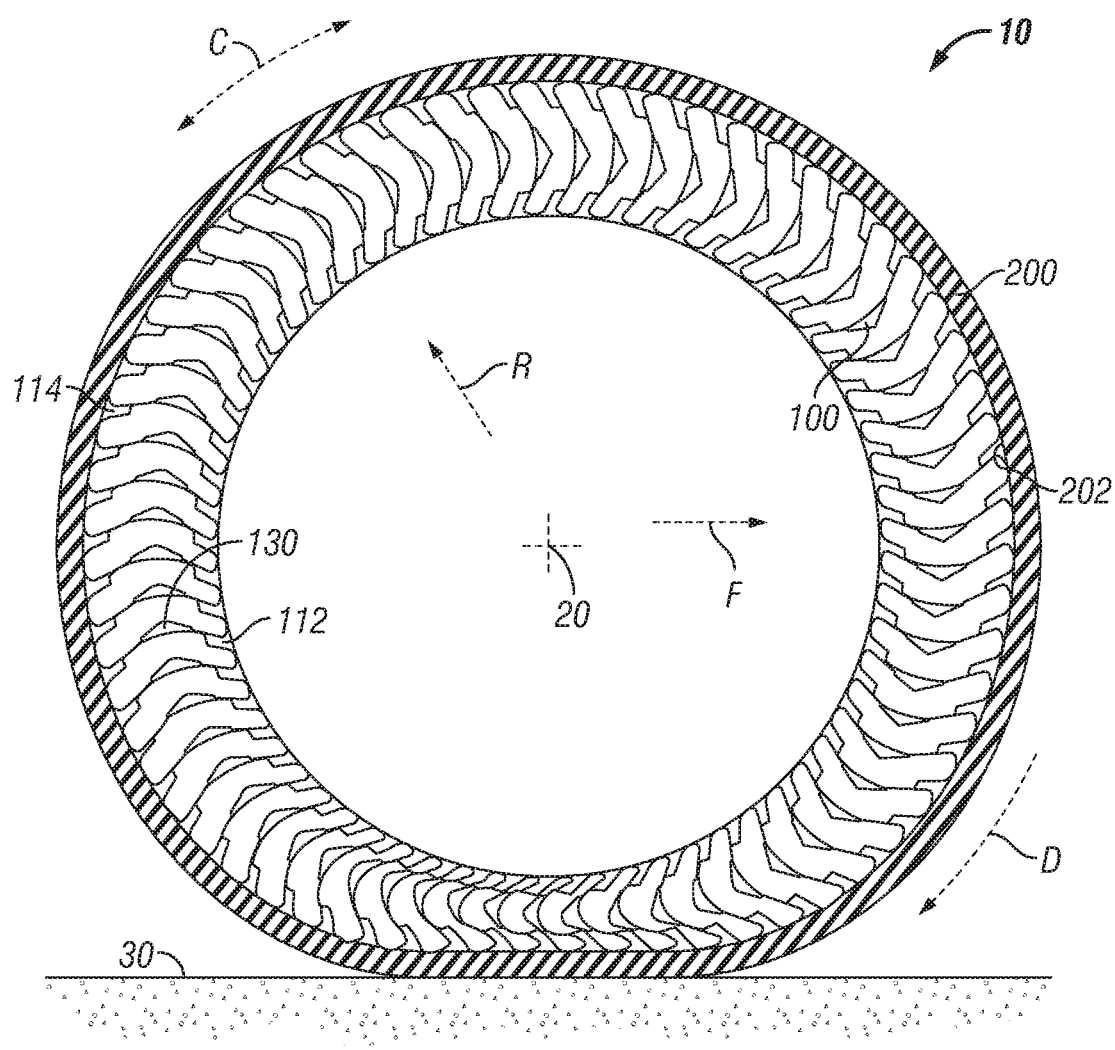
FIG. 2 provides a lateral side view of an exemplary embodiment of a plurality of spokes of the present invention forming a part of a tire under greater than nominal loading conditions.

FIG. 2 provides an exemplary embodiment of the present invention where the tire 10 is loaded in excess of its nominal load. The spokes 100 in this situation may make contact with one another as they enter, exit and or travel through the contact patch. While contact of an individual spoke with the spoke adjacent to it may occur, a portion of the load may be transferred in this case, through the radially inner foot 112, through the nose portion of the spoke 130, through the radially outer foot 114 and through the outer tread band 200 to the ground 30. In a sense, the shape of the spokes of the present embodiment shown may act as a "bump stop" to prevent structural damage to the legs of the spoke connecting the feet 112, 114 with the nose 130 of the spoke. Such conditions of loading in excess of the nominal load could occur with overloading the vehicle with excess mass, or could occur if the tire encounters an obstacle, such as a curb, while traveling at high speed.

Figure 3:
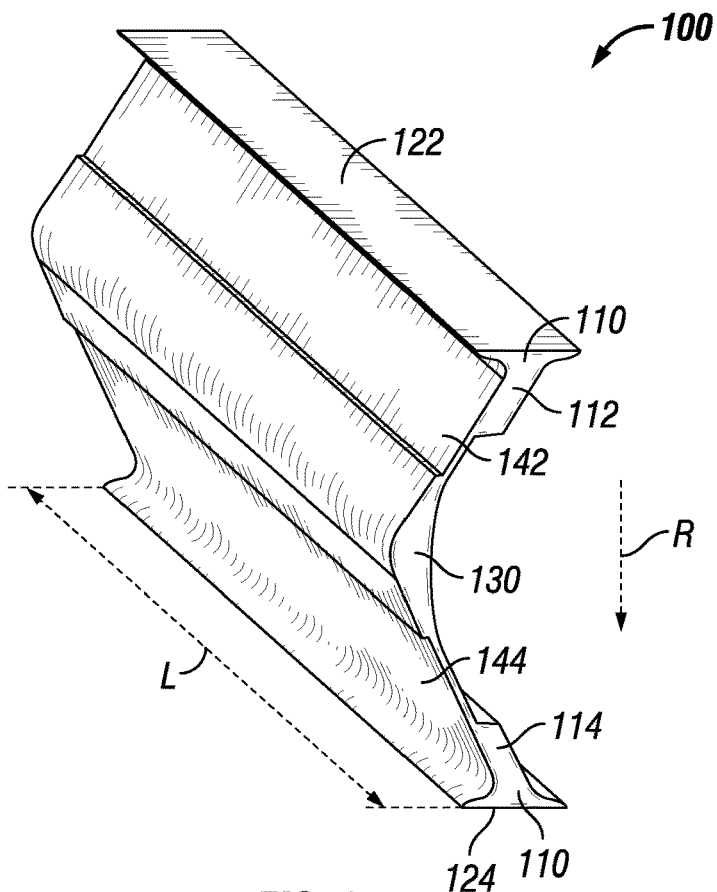
FIG. 3 provides a perspective view of an exemplary embodiment of a spoke of the present invention.

FIG. 3 provides a perspective view of the spoke 100 embodiment. In this particular embodiment, the spoke maintains a similar cross section profile in the lateral direction of the spoke. It can be seen that the feet 110, both the radially inner foot 112 and radially outer foot 114, each provide an attachment point to the hub and outer band 200 of the wheel. A widening in the circumferential direction at the radially inner end of the radially inner foot 112 provides circumferentially broad surface 122 for attachment, such as adhering, bonding and/or mechanically, to the hub. Likewise a widening in the circumferential direction at the radially outer end of the radially outer foot 114 provides circumferentially broad surface 124 for attachment, such as adhering, bonding and/or mechanically, to the outer tread band 200. The radially inner surface 122 and radially outer surface 124 in the embodiment shown are shown to be flat in the circumferential direction of the spoke. Alternatively, the surface of the radially inner surface 122 and radially outer surface 124 may also be curved in the circumferential direction of the spoke, for example to match the radius of curvature of the hub and radially inner surface 202 of the outer band 200 at the location where the spoke attaches in the respective positions.

The nose portion, or otherwise referred to as the "joint body" 130 of the spoke 100 of the embodiment shown has a triangular cross section and acts to connect a first and second spoke element, here comprising a radially inner leg 142 and a radially outer leg 144 respectively. The nose portion becomes thicker in the circumferential between the radially inner leg 142 and radially outer leg 144. The circumferential direction of the spoke is the same as the circumferential direction of the tire when the spoke, which is, in this case, the direction orthogonal to both the radial direction and the lateral direction.

It may be observed that the radially inner leg 142 is slightly shorter than the radially outer leg 142 in the embodiment shown. This difference in length accommodates the change in radius as the spoke travels through the contact patch maximizing the space available for the adjacent spokes to "nest."

Figure 4:
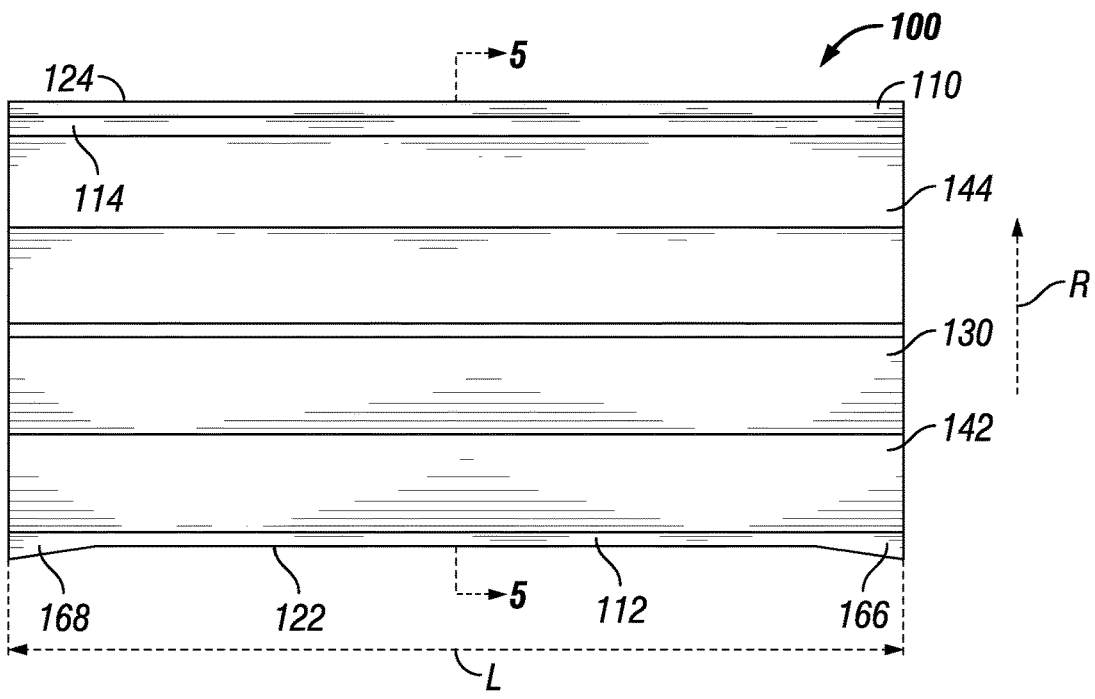
FIG. 4 provides a frontal view of the exemplary embodiment of the spoke.

FIG. 4 shows a front view of the spoke in a circumferential direction. The radially inner surface possesses a first and second protrusion 166, 168 which creates radially inner surface 122 that is curved in the lateral direction. This causes the cross section of the spoke 100 to vary slightly in the lateral direction. Alternatively the spoke 100 may maintain an identical cross section in the lateral direction.

Figure 5:
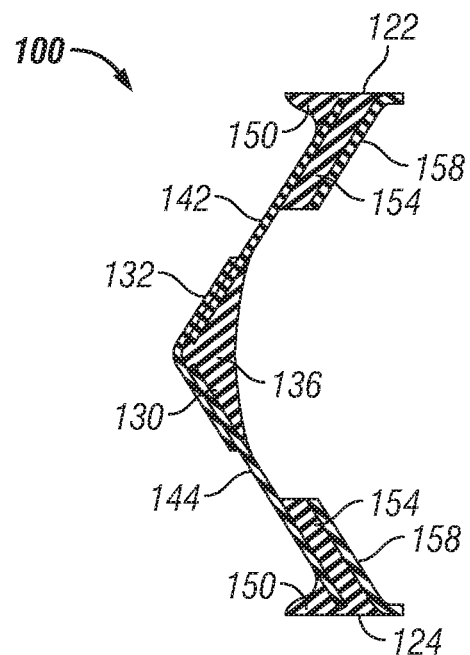
FIG. 5 provides a section view taken on line 5-5 of FIG. 4.

FIG. 5 shows a section view of the embodiment showing the main components of an individual spoke 100. The spoke 100 of the embodiment shown is comprised of rubber of the general type used in the construction of conventional rubber pneumatic radial tires, polyester cord material and fiberglass reinforced resin.

The rubber used in the embodiment shown comprises of a relatively soft rubber having a modulus of 4.8 MPa in the areas of the nose 136, and shear areas 154 of the radially inner and radially outer feet 110. The rear generally triangular portion 150 of the radially inner and radially outer feet 110 is a stiffer rubber having a modulus of approximately 30 MPa.

A membrane 132 is used to reinforce the nose section 130 of the spoke 100. The membrane structure 132 of the embodiment shown is comprised of polyester fibers made from an 1100 by 2 cord with a pace of approximately 1 mm and a tensile modulus of approximately 3,750 MPa. Such reinforcement fibers are similar to that commonly used in the radial cords of a pneumatic tire. The rubber surrounding the reinforcements of the membrane has a modulus of approximately 5 MPa. For the embodiment shown, this rubber is of a type used in the construction of a conventional pneumatic radial tire. Alternatively, other membrane reinforcement materials may be used, including using cords of other materials, such as aramid, cotton, nylon or rayon or combinations thereof. Alternatively, the reinforcement pace, filament count, cord count and diameter may vary. In the embodiment shown, the reinforcement membrane 132 extend approximately one-third of the height of the spokes, co-extensive with the generally triangular shaped nose reinforcement 136.

Foot reinforcement membranes 158 are used to reinforce the front portion of the spoke 100 radially inner foot 112 and radially outer foot 114. The foot reinforcement membranes 158 of the embodiment shown are comprised like that of the nose reinforcement membrane 132. The membrane structure 158 is comprised of polyester fibers made from an 1100 by 2 cord with a pace of approximately 1 mm and a tensile modulus of approximately 3,750 MPa. Such reinforcement fibers are similar to that commonly used in the radial cords of a pneumatic tire. The rubber surrounding the reinforcements of the membrane has a modulus of approximately 5 MPa. For the embodiment shown, this rubber is of a type used in the construction of a conventional pneumatic radial tire. Alternatively, other membrane reinforcement materials may be used, including using cords of other materials, such as aramid, cotton, nylon or rayon or combinations thereof. Alternatively, the reinforcement pace, filament count, cord count and diameter may vary. In the exemplary embodiment shown, the reinforcement membranes 158 extend from the front end of the spoke to approximately a quarter of height of the spoke.

The reinforcement cords of the reinforcement membranes 132, 158 of the exemplary embodiment are oriented in the radial direction along the length of the membranes.

The legs 142, 144 of the spoke 100 are comprised of fiber reinforced plastic filaments surrounded by a rubber to form a membrane. The leg membranes 142, 144 possess a flexural rigidity of approximately 140,000 N-mm². In this particular embodiment, the filaments have a diameter of approximately 1 mm with a pace of about 2 mm apart. The filaments of the embodiment shown are glass reinforced resin formed by pultrusion. The filaments of the embodiment have a modulus of approximately 10 MPa. Alternatively other filaments may be used, including carbon fiber such as graphite epoxy, glass epoxy or aramid reinforced resins or epoxy or combinations thereof. Alternatively other pacing and other diameters diameter of the membranes and filaments may be used. The legs 142, 144 of the spoke 100 have a relatively large stiffness compared to the other components comprising the spoke 100. The legs 142, 144 resist act resiliently and have a large bending stiffness allowing the nose portion 130 of the spoke to act as a joint body connecting the radially inner leg 142 with the radially outer leg 144. The feet 112, 114 act as second and third joint bodies, connecting the radially inner leg 142 to the hub and the radially outer leg 144 with the outer band 200.

Figure 6:
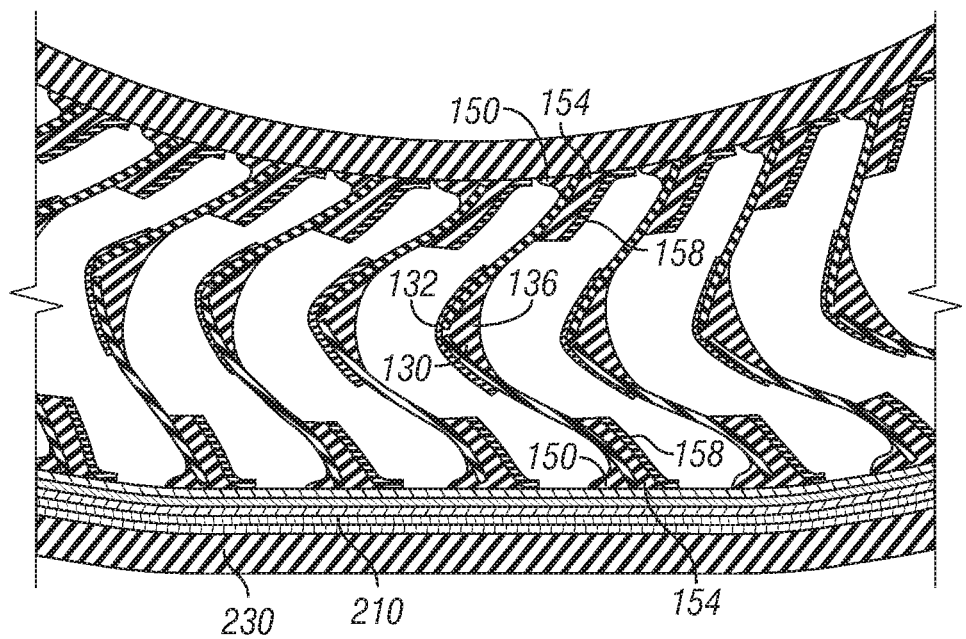
FIG. 6 provides a partial lateral side view of a plurality of spokes of the present invention forming a part of a tire under nominal loading conditions.

FIG. 6 shows a partial lateral section view of the exemplary embodiment of a plurality of spokes 100 of the present invention attached to an outer tread band 200 and forming a part of a tire 10. In the embodiment shown, the outer band 200 possesses reinforcement 210 to strengthen the outer band. A tread 230 is provided on the radially outer surface of the outer band 200. Under nominal loading conditions, for the tire of the exemplary embodiment 215/45 R17 sized tire shown here, the tire deflects 20 mm from the unloaded state. In the exemplary embodiment, 500 kg of mass load (approximately 4,900 N force) was used to approximate the nominal loading condition of the tire.

When the spoke 100 is deformed, the nose reinforcement 136 undergoes compression between the upper leg 142 and lower leg 144 of the spoke. The upper and lower foot 110 of the current embodiment shear material 154 deform in shear between the leg 140 and foot reinforcement membrane 158.

Figure 7:
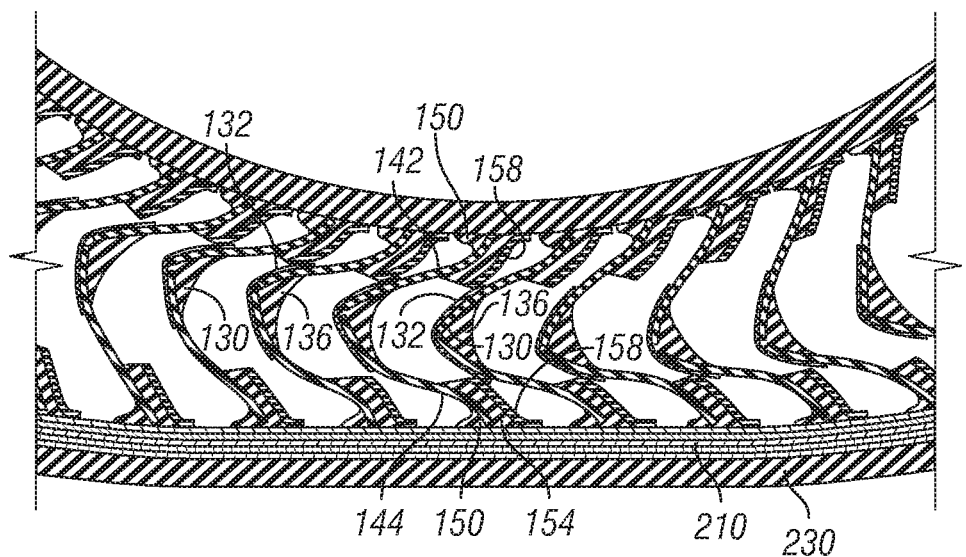
FIG. 7 provides a partial lateral side view of a plurality of spokes of the present invention forming a part of a tire under greater than nominal loading conditions.

FIG. 7 shows the same embodiment when exposed to an overload condition. In this particular instance, the tire was loaded with 1000 kg of mass load (approximately 9800 N force). In this case the deflection exceeded 20 mm and resulted in contact between the spoke nose portion 130 and spoke foot portions 110. Under such conditions, the nose and foot portions act as a "bump stop" unloading the leg portions of the spoke. As the spokes 100 enter the contact patch, the radially outer portion of the nose reinforcement membrane 132 touches the radially outer foot 114 of the adjacent spoke 100. Near the center of the contact patch, the nose portion 130 touches both the radially inner foot 112 and radially outer foot 114 of the adjacent spoke. As the spoke 100 exists the contact patch, the upper portion of the nose reinforcement membrane 132 touches the radially inner foot 112. The contact of the nose 130 with one or both of the feet 110 causes the spoke 100 to act as a "bump stop" and transfers the load through compression through the upper foot 112, nose portion 130 and lower foot 114, preventing the legs 142, 144 of the spoke from excessive deformation. While this particular embodiment behaves in this particular manner, other embodiments of the invention may behave differently, and may or may not exhibit "bump stop" qualities.

Figure 8:
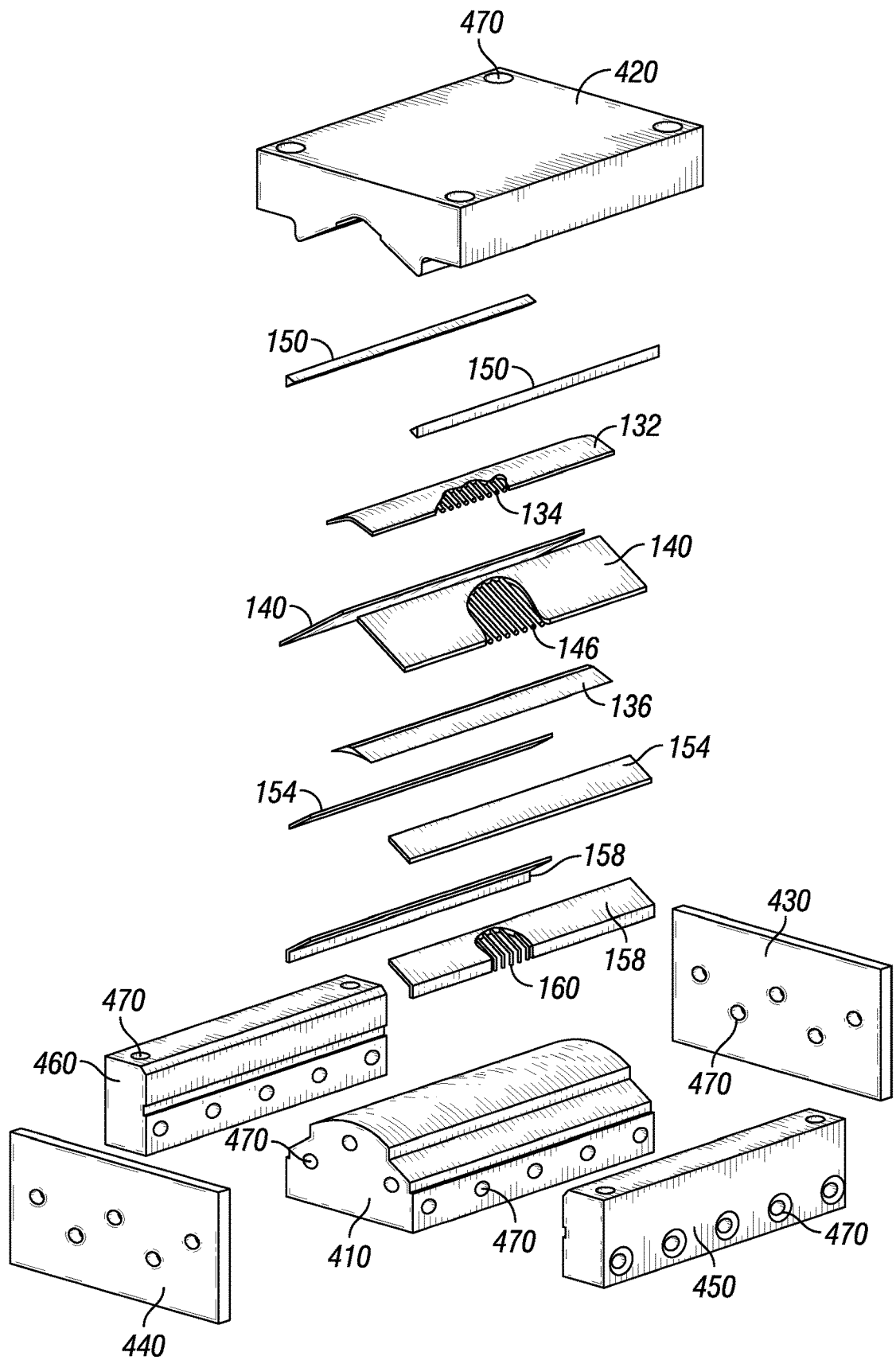
FIG. 8 provides a perspective view of an exemplary embodiment of a mold used for forming the embodiment of the spokes. The spoke components are shown, with some components having a portion of the elastic material removed to show reinforcement location and orientation.

FIG. 8 shows an exploded perspective view of a mold 410, 420, 430, 440, 450, 460 used to manufacture an individual spoke 100. The spoke components are shown separated as they are placed into the mold. Some of the spoke components show the orientation of the reinforcement fibers and cords. For example, the nose reinforcement membrane 132 reinforcements 134 are shown in the partial cutaway view of that component. The reinforcements are shown in this embodiment to run parallel to one another and along the width of the reinforcement membrane 132. Both of the legs 140, 142, 144 are shown and the radially inner leg 142 is shown with a partial cut-away showing the composite glass resin filaments positioned parallel to one another and along the width of the radially inner leg 142. The foot reinforcement membrane 158 of the radially inner foot 112 is shown with a portion of the rubber matrix surrounding the fiber reinforcement 160 removed. While the filaments 146 of the legs 140 are resiliently flexible, the fiber reinforcement 160, 134 of the foot reinforcement membrane 158 and nose reinforcement membrane 132 are flexible enough to be permanently deformed upon molding of the surrounding rubber matrix material.

Once the various uncured components are laid in place over the mold bottom 410, the mold 410, 420, 430, 440, 450, 460 is closed and secured. Here the mold is closed with screw fasteners through apertures 470 and secured to threaded portions of the apertures 470 of the mold components. Tightening of the fasteners exert pressure, or/and additional pressure may be applied to the mold top during curing. Heating of the mold 410, 420, 430, 440, 450, 460 heats the rubber components within and cures the rubber, adheres the rubber components together and forms a composite spoke having excellent resilient qualities of sufficient durability for use as a structural element in an automotive non-pneumatic tire.

Figure 9:
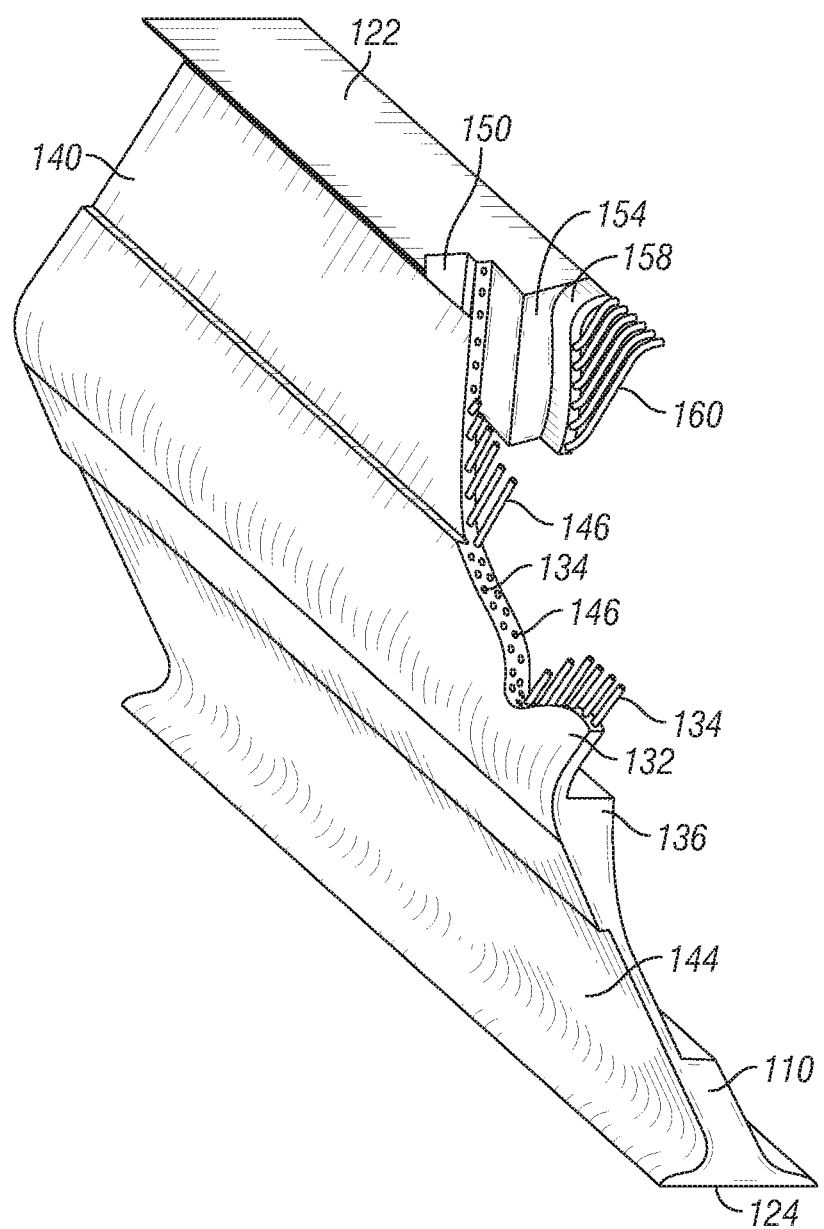
FIG. 9 provides a perspective view of an exemplary embodiment of the spoke of the present invention with a portion of the elastic material removed to show reinforcement location and orientation.

FIG. 9 shows a perspective cutaway view of the spoke embodiment. Portions of the reinforcement 134 of the nose reinforcement membrane 132 are shown, as well as a portion of the composite leg reinforcement filaments 146 of the leg 140 and a part of the foot reinforcements of the foot reinforcement membrane are shown as well.

Figure 10:
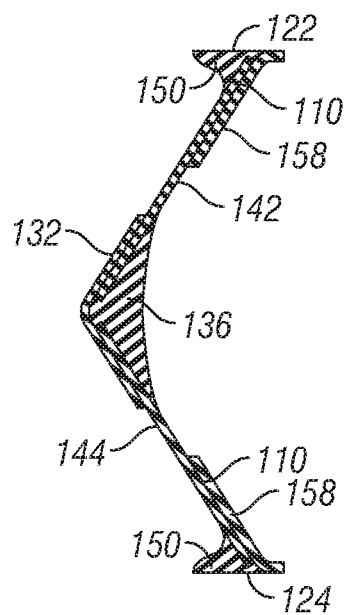
FIG. 10 shows an equatorial section view of an alternative embodiment of the invention.
Figure 11:
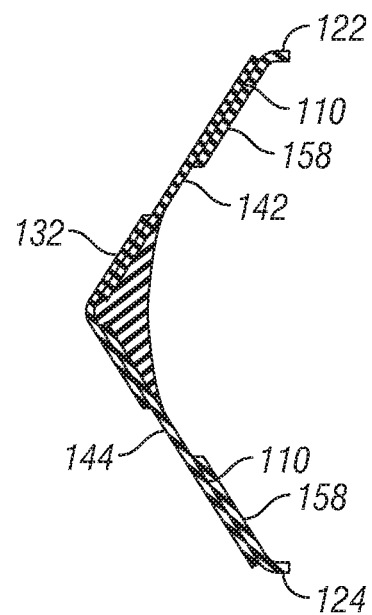
FIG. 11 shows an equatorial section view of an alternative embodiment of the invention.

Alternative embodiments of the invention are also possible and anticipated. For example, FIG. 10 shows an embodiment lacking a significant foot shear material portion 154. Some shearing would likely still occur, however between the reinforcement 160 of the foot 110 and the filament 146 of the leg 140. The load, however, would likely be resisted at least partially by compression of foot support portion 150 of the foot 110 and the nose support 136 of the nose 130 portion of the spoke.

Alternatively, the spoke may lack most, if not all of the foot support portion 150 at the foot portion 110 of the spoke 100. In such a configuration, the compressive resistance would be carried out predominantly by the nose support 136 of the nose in compression.

Figure 12:
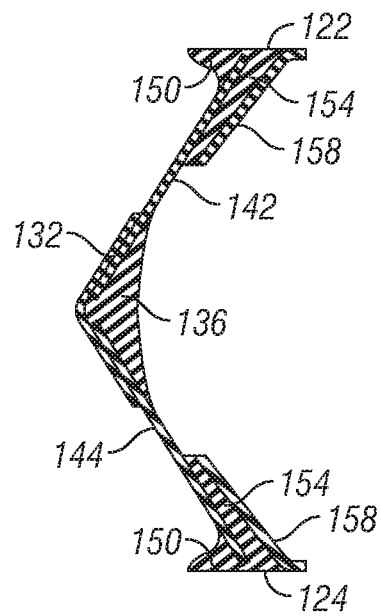
FIG. 12 shows an equatorial section view of an alternative embodiment of the invention.

Alternatively, the maximum strain on the leg reinforcements and foot shear material may be reduced by tapering the foot shear material as shown in FIG. 12. Here the foot shear material 154 tapers to a narrower portion toward the nose portion 130 of the spoke 100, and widens toward the radial ends of the spoke.

Figure 13:
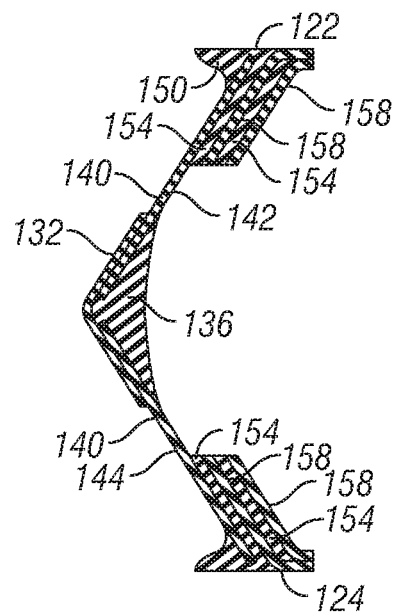
FIG. 13 shows an equatorial section view of an alternative embodiment of the invention.

Alternatively the feet 110 of the spokes may be reinforced with alternating layers of shear material 154 and foot reinforcement membranes 158. FIG. 13 shows two adjacent foot reinforcement membranes 158 separated by foot shear material 154. The leg 140 of the spoke is separated from the adjacent foot reinforcement membrane by a second layer of shear material 154.

Figure 14:
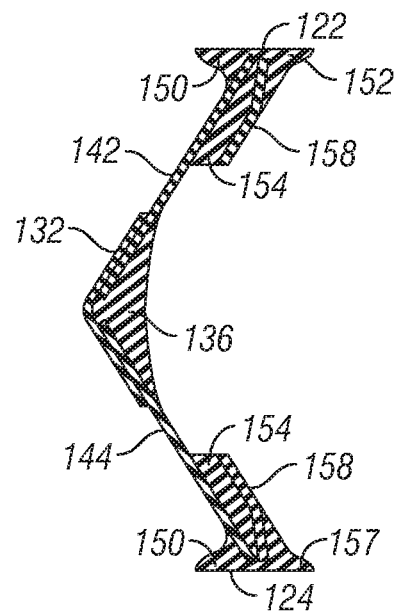
FIG. 14 shows an equatorial section view of an alternative embodiment of the invention.

FIG. 14 shows yet another spoke 100 embodiment. Here, the maximum shear strain at the front foot portion 152 is reduced by "burying" the foot reinforcement material between shear material and a foot shear support portion 152 of the spoke foot 110. The elastomer of the various components for any of the spokes may be changed, altering the shear stresses and resiliency of the spoke design. Here in this alternative embodiment, the foot shear support portion 152 utilizes a stiffer rubber, similar to the rubber used in the apex portion above the bead of a traditional pneumatic tire. The configuration of the components of this alternative embodiment decreases the "peeling stresses" created during deformation of the spoke at the front portion of the foot, increasing the durability of the spoke without a significant decrease in performance of the tire.

Figure 15:
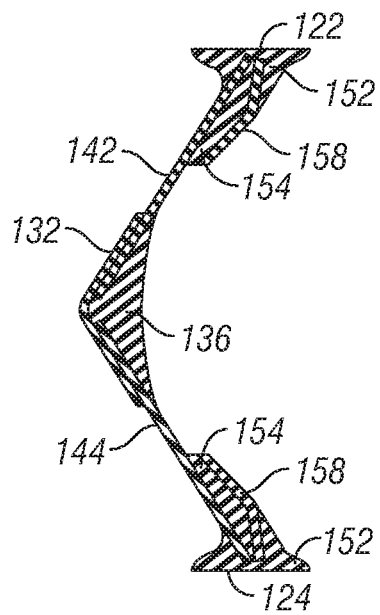
FIG. 15 shows an equatorial section view of an alternative embodiment of the invention.

In yet another alternative embodiment shown in FIG. 15, the feet 110 of the spoke 100 have a tapered foot shear material and a foot reinforcement membrane that is "buried" between the foot shear material and foot shear support 152 portion of the spoke. This combined configuration reduces the "peeling stress" at the spoke foot 110 interface with the hub or outer band 200 of the wheel and reduces the maximum stress along the spoke leg.

Figure 16:
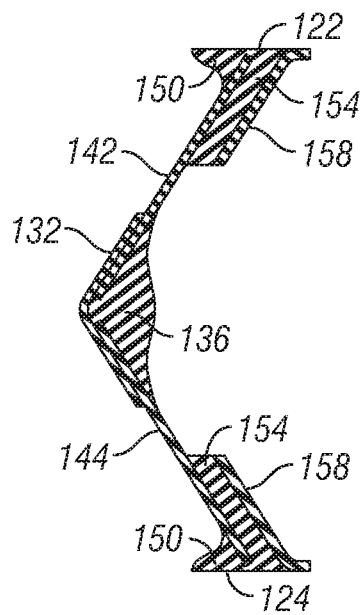
FIG. 16 shows an equatorial section view of an alternative embodiment of the invention.

FIG. 16 shows another embodiment having a nose support having a convex protrusion on the front portion of the nose support 136 of the spoke, providing a stiffer bending resistance of the joint body while utilizing material having the same modulus.

The "v-shape" of the embodiments of the spoke shown and described herein allow the adjacent spokes to "nest" and give linear spring rate when deflected radially over a distance approximately equal to the tires vertical deflection. The nesting of the spokes avoid adjacent spokes from clashing under normal loading conditions.

It should be understood by a person of ordinary skill in the art that the stiffness of the spoke may be adjusted by adjusting the length of the "v" of the "v-shaped spoke", the constituent material moduli and the internal architecture of the spoke.

It should be understood that other web element configurations and geometries may be used within the scope of the invention, including web elements which are interconnected such as where they may form a honeycomb or other pattern.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" Also, the dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

As used herein, the term "method" or "process" refers to one or more steps that may be performed in other ordering than shown without departing from the scope of the presently disclosed invention. As used herein, the term "method" or "process" may include one or more steps performed at least by one electronic or computer-based apparatus. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

The terms "a," "an," and the singular forms of words shall be taken to include the plural form of the same words, such that the terms mean that one or more of something is provided. The terms "at least one" and "one or more" are used interchangeably. Ranges that are described as being "between a and b" are inclusive of the values for "a" and "b."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

What is claimed is:

1. A spoke for a tire, said tire being attached to a hub comprising:
   an outer tread band;
   a first spoke element comprised of an elastomer surrounding a fiber reinforced plastic;
   a second spoke element comprised of an elastomer surrounding a fiber reinforced plastic; and
   a joint body connecting said first spoke element and said second spoke element, wherein said joint body comprises an elastic material arranged such that said first spoke element and said second spoke element is deflectable in at least a first plane of bending, wherein the first spoke element and second spoke element are disposed between said hub and said outer tread band.

2. The spoke of claim 1 having a second joint body connecting the first spoke element to said hub.

3. The spoke of claim 2 having a third joint body connecting the second spoke element to said outer tread band.

4. The spoke of claim 3 wherein the second and third joint bodies are comprised of a rubber elastomer.

5. The spoke of claim 4 wherein the second and third joint bodies possess a reinforcement membrane.

6. The spoke of claim 5 wherein the reinforcement membrane of the second and third joint bodies are comprised of cords.

7. The spoke of claim 6 wherein the reinforced membrane of the second and third joint bodies are comprised of cords comprised of a material selected from a group consisting of polyester, rayon, aramid, nylon, and cotton.

8. The spoke of claim 1 wherein the first spoke element and the second spoke element are each further comprised of filaments oriented in the radial direction.

9. The spoke of claim 1 wherein the joint body is comprised of a rubber elastomer.

10. The spoke of claim 1 wherein the joint body is comprised of a reinforced membrane connecting the first and second spoke elements.

11. The spoke of claim 10 wherein the reinforced membrane of the joint body is comprised of cords.

12. The spoke of claim 11 wherein the reinforced membrane of the joint body is comprised of cords comprised of a material selected from a group consisting of polyester, rayon, aramid, nylon, and cotton.

13. A spoke for a tire, the tire comprised of a plurality of the spokes attached to an outer tread band, the tire being attachable to a hub, the spoke comprising:
    a first spoke element comprised of an elastomer surrounding a fiber reinforced plastic;
    a second spoke element comprised of an elastomer surrounding a fiber reinforced plastic; and
    a first joint body connecting the first spoke element and the second spoke element, a second joint body connecting the first spoke element to the hub.
    a third joint body connecting the second spoke element to the outer tread band wherein the first joint body comprises an elastic material arranged such that the first spoke element and the second spoke element is deflectable in at least a first plane of bending, wherein the first spoke element and the second spoke element are disposed between the hub and the outer tread band.

14. The spoke of claim 13 wherein the first spoke element and the second spoke element are each further comprised of filaments oriented in the radial direction.

15. The spoke of claim 13 wherein each joint body is comprised of a rubber elastomer.

16. The spoke of claim 15 wherein the first joint body is comprised of a reinforced membrane connecting the first and second spoke elements.

17. The spoke of claim 16 wherein the reinforced membrane of the joint body is comprised of cords.

18. The spoke of claim 17 wherein the reinforced membrane of the joint body is comprised of cords comprised of a material selected from a group consisting of polyester, rayon, aramid, nylon, and cotton.

* * * * *